United States Patent
Lobo et al.

(10) Patent No.: US 8,799,110 B2
(45) Date of Patent: Aug. 5, 2014

(54) SIMPLIFIED CONFIGURATION OF TOUCHLESS BUYING

(75) Inventors: Rohit Lobo, Santa Clara, CA (US); Suman Guha, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 962 days.

(21) Appl. No.: 12/558,481

(22) Filed: Sep. 11, 2009

(65) Prior Publication Data

US 2011/0066455 A1  Mar. 17, 2011

(51) Int. Cl.
*G06Q 30/00* (2012.01)
*G06Q 30/06* (2012.01)

(52) U.S. Cl.
CPC ........ *G06Q 30/0603* (2013.01); *G06Q 30/0635* (2013.01); *G06Q 30/0637* (2013.01); *G06Q 30/0613* (2013.01); *G06Q 30/0633* (2013.01)
USPC ................... 705/26.81; 705/26.41; 705/26.8; 705/26.82

(58) Field of Classification Search
CPC .......... G06Q 30/0601; G06Q 30/0613; G06Q 30/0633; G06Q 30/0635; G06Q 30/0637; G06Q 30/0603
USPC ............... 705/26.1, 26.41, 26.8, 26.81, 26.82
See application file for complete search history.

(56) References Cited

U.S. PATENT DOCUMENTS

| | | | |
|---|---|---|---|
| 7,363,249 B1 * | 4/2008 | Boesjes | 705/26.81 |
| 7,818,714 B2 * | 10/2010 | Ryan et al. | 717/104 |
| 8,484,095 B1 * | 7/2013 | Federighi et al. | 705/26.4 |
| 2003/0149578 A1 * | 8/2003 | Wong | 705/1 |
| 2005/0004845 A1 * | 1/2005 | Vaughn | 705/26 |
| 2005/0197910 A1 * | 9/2005 | Wittmer et al. | 705/26 |
| 2005/0197921 A1 * | 9/2005 | Abo-Hasna et al. | 705/26 |
| 2008/0172237 A1 * | 7/2008 | Lai et al. | 705/1 |
| 2009/0240541 A1 * | 9/2009 | Smith | 705/7 |

FOREIGN PATENT DOCUMENTS

WO   WO-2007021920 A2 *   2/2007

OTHER PUBLICATIONS

D'Amico, M.L., "Oracle Touts Rapid 'Net Procurement Deployment," Network World, Feb. 15, 2000.*
Cohen, S.L., "Asymmetric Information in Vendor Managed Inventory Systems," Ph.D. Abstract, vol. 6102A of Dissertation Abstracts International, p. 670, Year 2000.*
Anon., "Empower Solutions Increases Public School Procurement Efficiency," PR Newswire, May 7, 2003.*

(Continued)

*Primary Examiner* — Nicholas D Rosen
(74) *Attorney, Agent, or Firm* — Trellis IP Law Group, PC

(57) ABSTRACT

In one embodiment, controls for an agreement from a supplier are set up. The agreement includes a plurality of items for purchase. The controls may be used to determine a degree of touchlessness in the buying of the items. The controls may be configured at the agreement level. A requisition from a requester for a target item is received. In one embodiment, sourcing rules and ASLs may be searched to determine if a sourcing rule and ASL applies to the item. If so, then the sourcing rule and ASL may be used to determine an agreement. If a sourcing rule and ASL do not apply, agreements can be searched to determine an agreement for the target item. Once the agreement is determined, controls are determined from the agreement, where the controls govern the plurality of items of the agreement.

20 Claims, 6 Drawing Sheets

(56) References Cited

OTHER PUBLICATIONS

Moore, J., "E-Procurement Pays Its Own Way," Federal Computer Week, vol. 21, No. 8, pp. 44-46, Apr. 2, 2007.*

Coghlan, J., "CD-ROMs: in Print, 1991: An International Guide," Database, vol. 14, No. 3, p. 89, Jun. 1991.*

Bakowski, V.B., "1991 Drugs Available Abroad: A Guide to Therapeutic Drugs Available and Approved Outside the U.S.," RQ, vol. 31, No. 1, p. 87, Fall, 1991.*

Anon., "Keep It Open: Deals Made with Defendants Should Be Accessible," McClatchy-Tribune Regional News—The Salt Lake Tribune—Utah, Sep. 18, 2008.*

Oracle Data Sheet entitled "Oracle Purchasing" obtained at http://www.oracle.com/applications/procurement/Purchasing-data-sheet.pdf; 5 pages; Copyright 2006.

* cited by examiner

SIMPLIFIED CONFIGURATION OF TOUCHLESS BUYING

BACKGROUND

Particular embodiments generally relate to purchase order generation for touchless buying.

A procurement system allows buyers to purchase items. A touchless buying process automatically converts an approved requisition into a purchase order and communicates it to a supplier without manual intervention from a buyer. In the conventional process, to enable the touchless buying process, a large amount of configuration is required. For example, for each item, sourcing rules need to be set up to allow the selection of a supplier. In addition, for each item, an approved supplier list (ASL) entry needs to be configured to govern generation of the purchase order for the item. The ASL includes the controls that govern whether touchless buying can be used to generate a purchase order for the item/supplier. The problem with the conventional solution lies in the level of effort required to setup and maintain the sourcing rules and ASL entries. The setup for sourcing rules and ASL entries are expensive because they are defined per item or category of the item.

Maintaining a separate sourcing rule that specifies who the supplier should be and an ASL entry may result in unnecessary overhead. One example illustrates the cost of this overhead. For an agreement for office supplies with 1000 line items, to enable touchless buying, a company has to setup:

1000 ASL entries, one for each line item; and
1000 sourcing rules, one for each line item.

At 5 minutes per ASL entry and 2 minutes per sourcing rule, the effort estimates to enable touchless buying are 7000 minutes (approx 116 hrs). Further to setting this up, the company will need to maintain these sourcing rules and ASL entries going forward, which adds additional cost.

SUMMARY

Particular embodiments generally relate to touchless buying for procurement systems. In one embodiment, controls are setup for an agreement with a supplier. The agreement includes a plurality of items for purchase. The controls may be used to determine a degree of touchlessness in the buying of the items and may be configured at the agreement level. A requisition from a requestor for an item is received. In one embodiment, sourcing rules and ASLs may be searched to determine if a sourcing rule and ASL apply to the item. If so, then the sourcing rule and ASL may be used to determine a suitable agreement. If an applicable sourcing rule and ASL do not exist, agreements can be directly searched to determine a suitable agreement for the target item. Although searching sourcing rules and ASLs is described, it will be understood that agreements may be searched without searching sourcing rules and ASLs. For example, the setup of sourcing rules and ASLs may be optional. Once the agreement is determined, controls are determined from the agreement, where the controls govern the plurality of items of the agreement. For example, controls are not configured for each item but rather configured for the agreement as a whole. The controls may be used to determine if a purchase order can be automatically generated and sent to a supplier without manual intervention from a buyer. If so, the purchase order is automatically generated and can be sent for approval or auto-approved. The approved purchase order is then sent to a supplier.

In one embodiment, a method is provided comprising: receiving one or more controls for a plurality of agreements, each agreement including a plurality of items for purchase; receiving a requisition from a requestor for a target item; determining an agreement from the plurality of agreements that includes the target item from the requisition within a plurality of items included in the agreement; determining, by a computing device, one or more controls for the agreement, the controls being set for the agreement; determining if the one or more controls indicate the requisition should be automatically converted to a purchase order; automatically generating, by the computing device, the purchase order for the target item if the one or more controls for the agreement indicate the requisition should be automatically converted to the purchase order; and outputting the purchase order, the purchase order generated without manual intervention by a buyer.

In another embodiment, a computer-readable storage medium comprising encoded logic for execution by the one or more computer processors is provided. The logic when executed is executable to: receive one or more controls for a plurality of agreements, each agreement including a plurality of items for purchase; receive a requisition from a requestor for a target item; determine an agreement from the plurality of agreements that includes the target item from the requisition within a plurality of items included in the agreement; determine, by the one or more computer processors, one or more controls for the agreement, the controls being set for the agreement; determine if the one or more controls indicate the requisition should be automatically converted to a purchase order; automatically generate, by the one or more computer processors, the purchase order for the target item if the one or more controls for the agreement indicate the requisition should be automatically converted to the purchase order; and output the purchase order, the purchase order generated without manual intervention by a buyer.

In yet another embodiment, an apparatus is provided comprising: one or more computer processors; and logic encoded in one or more computer-readable storage media for execution by the one or more computer processors. The logic when executed is executable to: receive one or more controls for a plurality of agreements, each agreement including a plurality of items for purchase; receive a requisition from a requestor for a target item; determine an agreement from the plurality of agreements that includes the target item from the requisition within a plurality of items included in the agreement; determine, by the one or more computer processors, one or more controls for the agreement, the controls being set for the agreement; determine if the one or more controls indicate the requisition should be automatically converted to a purchase order; automatically generate, by the one or more computer processors, the purchase order for the target item if the one or more controls for the agreement indicate the requisition should be automatically converted to the purchase order; and output the purchase order, the purchase order generated without manual intervention by a buyer.

A further understanding of the nature and the advantages of particular embodiments disclosed herein may be realized by reference of the remaining portions of the specification and the attached drawings.

BRIEF DESCRIPTION OF THE DRAWINGS

FIG. 2 shows an example of an interface that may be used to configure controls for an agreement according to one embodiment.

FIG. 3 depicts an example interface for setting the terms for an agreement according to one embodiment.

DETAILED DESCRIPTION OF EMBODIMENTS

Particular embodiments eliminate the expensive tasks of maintaining the sourcing rules and ASL entries on a per item/category basis. Except for a limited number of items where you might not want to rely on a single supplier, for most other items that are candidates for touchless buying, the items are usually procured from a single supplier at any point of time with whom there is a pre-negotiated agreement in place. Also the touchless buying controls that apply to any such item typically apply to all other items included in the same pre-negotiated agreement. For these items, it is an unnecessary overhead to maintain a separate sourcing rule that specifies who the supplier should be and an ASL entry just for the sake of maintaining the touchless buying controls.

The location of an active agreement that can be used to buy the item for the requested organization should be enough to enable touchless buying for such items. In one embodiment, all of the information needed to enable touchless buying may be determined as follows. Once the agreement is determined, the agreement's supplier would be the supplier to whom the order would be issued. In most procurement transactions, the same set of controls applies to all items in the same agreement. Thus, the agreement itself can house these controls eliminating the need to maintain them on ASL entries. Also, the agreement contains all the necessary terms and conditions and pricing details that would be leveraged to create the order. Companies do not need to setup or maintain sourcing rules and ASL entries if they have a simple procurement strategy with a single source for their items. Particular embodiments offer a vastly reduced setup and maintenance cost for their touchless buying process by not maintaining sourcing rules and ASLs on a per item basis. For companies that deal in areas with multiple sources, sourcing rules and ASL entries can still be used, if necessary.

Accordingly, particular embodiments provide agreements that include the controls that are used to determine the degree of touchless buying. Also, the controls apply to all items in the agreement. For most entities with a simple procurement strategy, just setting up an agreement with the controls is sufficient. ASLs and sourcing rules do not need to be setup at all. This saves a significant setup time in comparison to the conventional method of configuring sourcing rules and ASL entries with controls for all items.

Figure 1A:
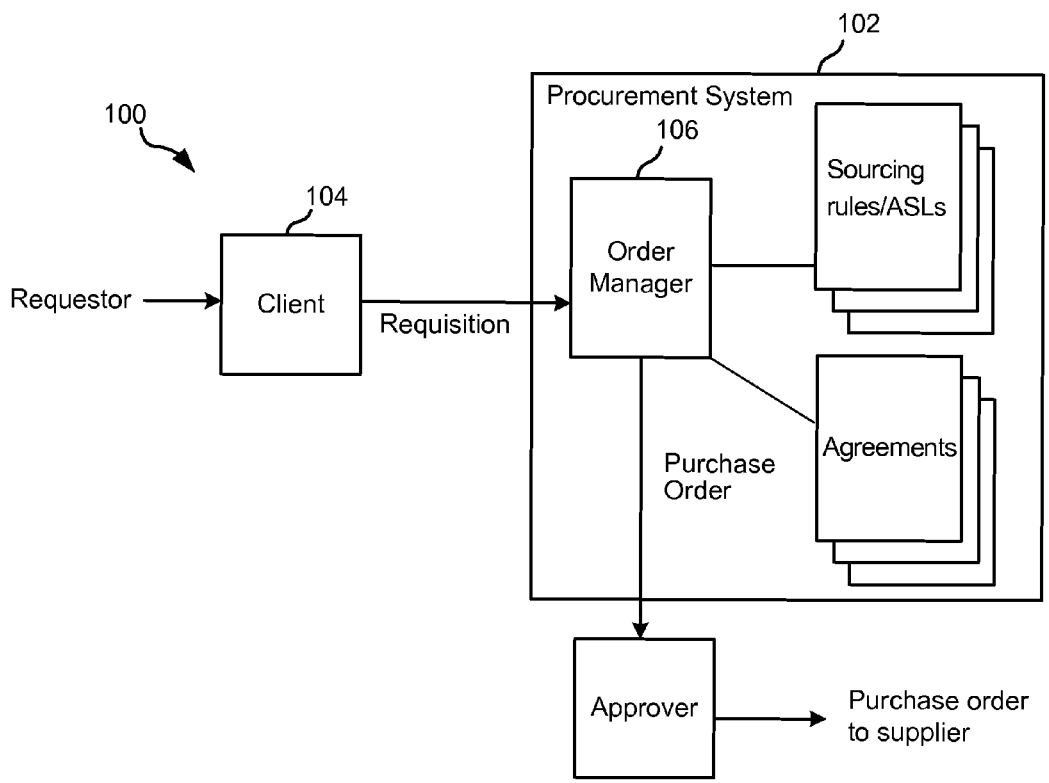
FIG. 1A depicts a simplified system for a procurement system according to one embodiment.

FIG. 1A depicts a simplified system 100 for a procurement system according to one embodiment. System 100 includes a procurement system 102 and a client 104. It will be understood that any number of procurement systems 102 and clients 104 may be included in system 100. Also, it will be understood that functions described for procurement system 102 may be performed using any number of computing devices and functions may be distributed among different computing devices.

Client 104 may be any computing device used by a requester to input a requisition. Procurement system 102 may be a catalog that users can browse to order items. A requisition may be an order for one or more items, which may be goods or services that may be offered by a supplier. The supplier may be any entity, such as an external entity, third party, or other organization that offers the goods or services. A requestor may be a user that has ordered the item. A requisition may be generated using client 104 and sent to procurement system 102. In one embodiment, the requisition may be approved by the appropriate users, such as by a manager of the requester. Touchless buying may be provided in that a buyer does not need to convert a requisition to a purchase order that is used to purchase the item from the supplier, instead the system automatically generates the purchase order from the approved requisition.

Figure 1B:
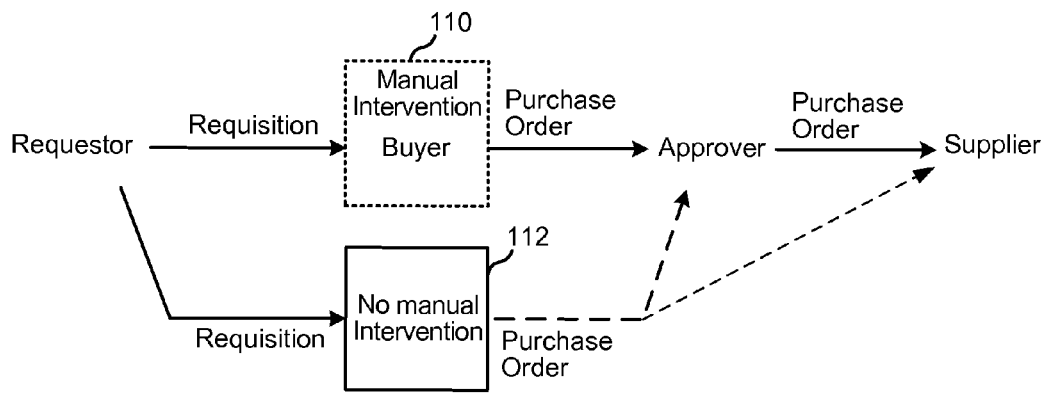
FIG. 1B shows a flow that illustrates touchless buying according to one embodiment.

FIG. 1B shows a flow that illustrates touchless buying according to one embodiment. Two flows are shown, one with manual intervention at 110 and no manual intervention (i.e., touchless buying) at 112. For a first flow, the requestor creates a requisition for an item. The requisition is then sent for approval to the appropriate users, such as the manager of the requestor. At 110, once the requisition is approved, a buyer converts the requisition to a purchase order. A buyer may be a user that manually generates purchase orders from requisitions. The purchase order is then sent to an approver for approval. The approver may be any user that is authorized to approve the purchase order. Once the purchase order is approved, then it can be sent to the supplier.

For a second flow, the requester creates a requisition for an item. At 112, the requisition is automatically converted to a purchase order based on controls on the agreement. For example, controls of an agreement may indicate that requisitions should be automatically converted to a purchase order. Thus, the buyer is not involved in the purchase order generation. The purchase order may be sent to an approver for approval. Once the purchase order is approved, then it can be sent to the supplier. Also, the controls may indicate that the purchase order can be automatically submitted for approval and sent to the supplier. Accordingly, touchless buying allows conversion of a requisition to a purchase order without involving a buyer.

Referring back to FIG. 1A, procurement system 102 includes order manager 106, sourcing rules/ASLs, and a plurality of agreements. Order manager 106 is configured to receive a requisition and generate a purchase order for a supplier. Order manager 106 allows touchless buying that automatically converts an approved requisition into a purchase order and communicates it to the supplier without manual intervention from a buyer. Touchless buying frees up precious time for the buyer because the buyer does not need to manually convert the requisition into a purchase order. The term no manual intervention may be that the buyer may not need to perform any action to have the purchase order generated once the requisition is received at order manager 102.

Particular embodiments apply touchless buying controls for all items in an agreement. The agreements may be negotiated in advance and are used to generate purchase orders. Procurement system 102 may include many different agreements from many different suppliers. Some suppliers may offer the same item. The requisition may be used to determine how many items should be ordered and where to route the items, but the agreement governs the terms that are used to generate the purchase order. Further, controls are provided to determine the degree of touchlessness for the purchase order. The different degrees may be:

1. Do not do any automatic processing and let the buyer process it manually.
2. Create the order automatically but let the buyer review it before submitting for approval and dispatch.

3. Automatic creation and communication of the order.

To provide touchless buying, the agreements need to be configured. Particular embodiments provide for a simplified configuration of touchless buying. For example, touchless buying controls are applied on a per-agreement basis. Each agreement may include a plurality of items that can be ordered. The controls are specified for the entire agreement and apply to all its items. This is different from the conventional method of having to specify controls for each item individually, such as in each item's ASL entry. The controls contain information that is used to enable and configure touchless buying. The controls may be used to determine a degree of touchlessness.

When an agreement is used to generate a purchase order, the controls are applicable for all the items that are found in the agreement. If an item is ordered using an agreement, the agreement's controls are used to determine the degree of touchlessness that can be applied. An agreement might have thousands of items. By providing controls on an agreement basis, the amount of configuration is reduced. The user can setup the controls just once on the agreement. They no longer need to setup and configure sourcing rules and ASLs for each of the thousands of items. As described above, a large amount of time is needed to configure controls for each item in an ASL entry. If an organization does business with multiple suppliers, and has an agreement with each supplier, the potential configuration and setup time saved is very large.

Figure 1C:
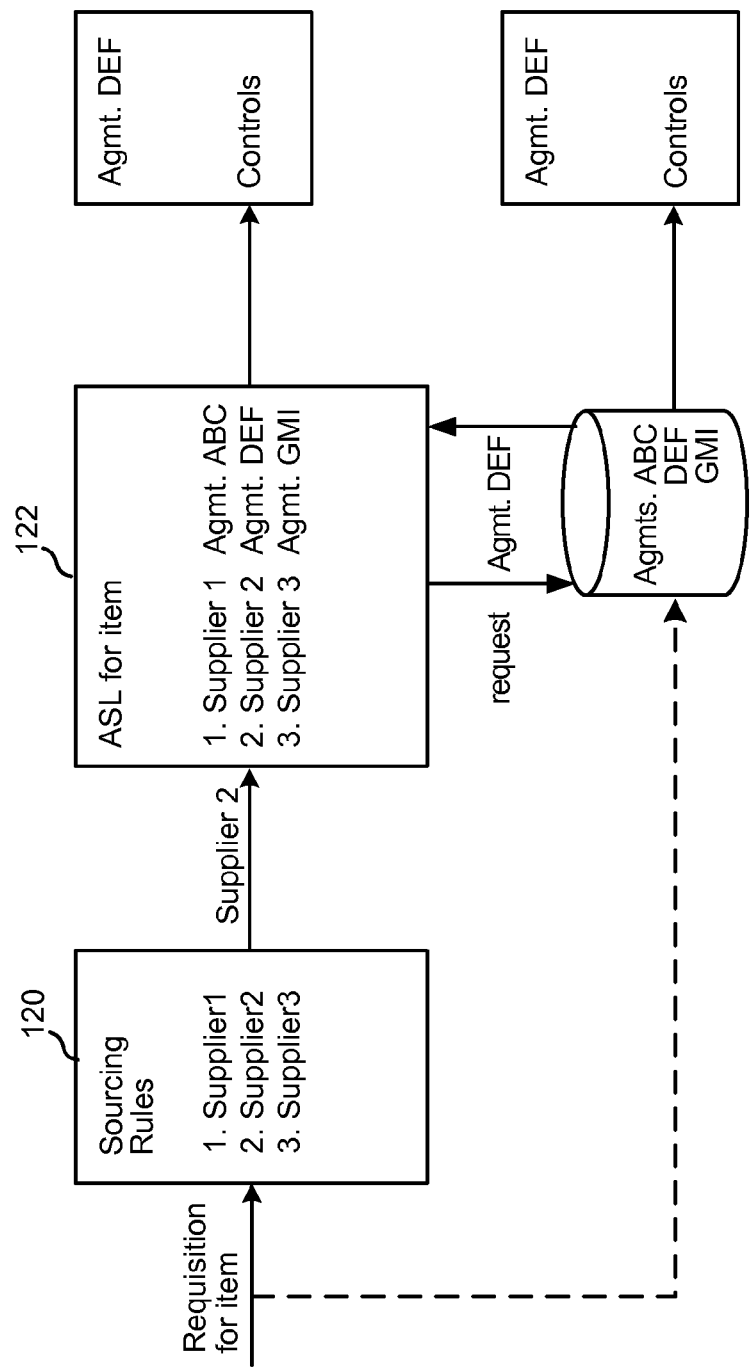
FIG. 1C shows an example of flows for generating purchase orders according to one embodiment.

The purchase orders may be generated using different methods. FIG. 1C shows an example of flows for generating purchase orders according to one embodiment. The two flows involve determining whether sourcing rules/ASLs are applicable for the item. If so, sourcing rules/ASLs are used to determine an agreement. If a sourcing rule/ASL is not applicable, then agreements are searched to determine an agreement that can be used to generate the purchase order.

In the first flow, when order manager 102 receives a requisition, sourcing rules may be reviewed to determine if a sourcing rule is applicable for the item at 120. As shown, three sourcing rules are found for three suppliers, Supplier1, Supplier2, and Supplier3. The sourcing rules are used to determine a supplier that will be used to supply the item. The sourcing rules allow specification of preferred suppliers for a requested item, a category of a requested item, a requested item from a specific supplier, a category of a requested item from a specific supplier, etc. The determined source could be in the form of a specific supplier or multiple suppliers ranked in different tiers with different allocation percentages in each tier. For example, an organization may have rules that disperse a certain percentage of orders to different suppliers. It is also possible to maintain different sets of suppliers as preferred source for different periods of time. In this case, the sourcing rules are evaluated for the item (or an item category that includes the item) and the supplier is determined.

Once the supplier is determined, an approved supplier list (ASL) entry for the item is determined at 122. The ASL is an entry for the item and includes different suppliers and appropriate agreements that should be used. In this case, Supplier2 was selected using the sourcing rule and is used to determine an agreement DEF in the ASL. Agreement DEF includes the controls that are used to determine how the purchase order should be generated. In the case where no agreement is found on the ASL entry, the process may end.

In a second flow, if a sourcing rule or ASL is not found, agreements may be searched. An active agreement that can be used to buy the item may be determined. The active agreement may be the most recently created agreement that includes the item in one embodiment. The agreement's supplier is the supplier to whom the purchase order is issued. Thus, an item search for agreements is performed. The agreement that is selected may not be determined by searching for a specific supplier because sourcing rules are not used to determine a preferred supplier. The agreement itself stores the controls eliminating the need to maintain them on ASL entries.

Agreement DEF may be determined as the most recent agreement; however, it is possible that agreements ABC or GHI may be determined. Agreement DEF, if determined, includes the controls that are used to determine how the purchase order should be generated.

Thus, in both flows, the agreement includes the controls that are used to determine the degree of touchless buying. Also, the controls apply to all items in the agreement. This allows agreements to be searched in the second flow without using ASL entries because the controls are found in the agreement, and not the ASL entry. Also, ASL entries do not need to have controls configured for each entry (also ASLs and sourcing rules do not need to be setup at all for a simple procurement strategy). This requires less time than the conventional method of configuring controls for each ASL entry.

In addition to providing controls for the agreements, the agreement has all the terms (e.g., necessary terms and conditions and pricing details) that would be leveraged to create the purchase order. The terms may be parameters that are used to create the purchase order. The terms and conditions may include the quantity limits that can be ordered, the supplier information, and supplier preferences (e.g., carrier, free on board (FOB), payment terms). Also, the agreed-upon price limits and amount limits may be included. These terms and conditions may apply to all of the items in the agreement.

The terms may be negotiated with a supplier and are captured on the agreement. For example, a blanket purchase agreement document may be used as a long-term agreement for the purchase of goods and services from a supplier. It includes the terms and conditions, details of the goods or services to be purchased from the supplier, and negotiated amounts. However, it does not contain the delivery dates or individual delivery quantities or amounts. These details are specified in subsequent purchase orders issued against the agreement.

Referring back to FIG. 1A, when generating a purchase order for the agreement, order manager 106 determines the controls and terms from the agreement and can then generate the purchase order for the item. The terms are applied to the item when generating the purchase order.

The purchase order may be sent to an approver for approval. After approval, the purchase order is sent to the supplier. Also, the purchase order may be auto-approved.

Figure 2:
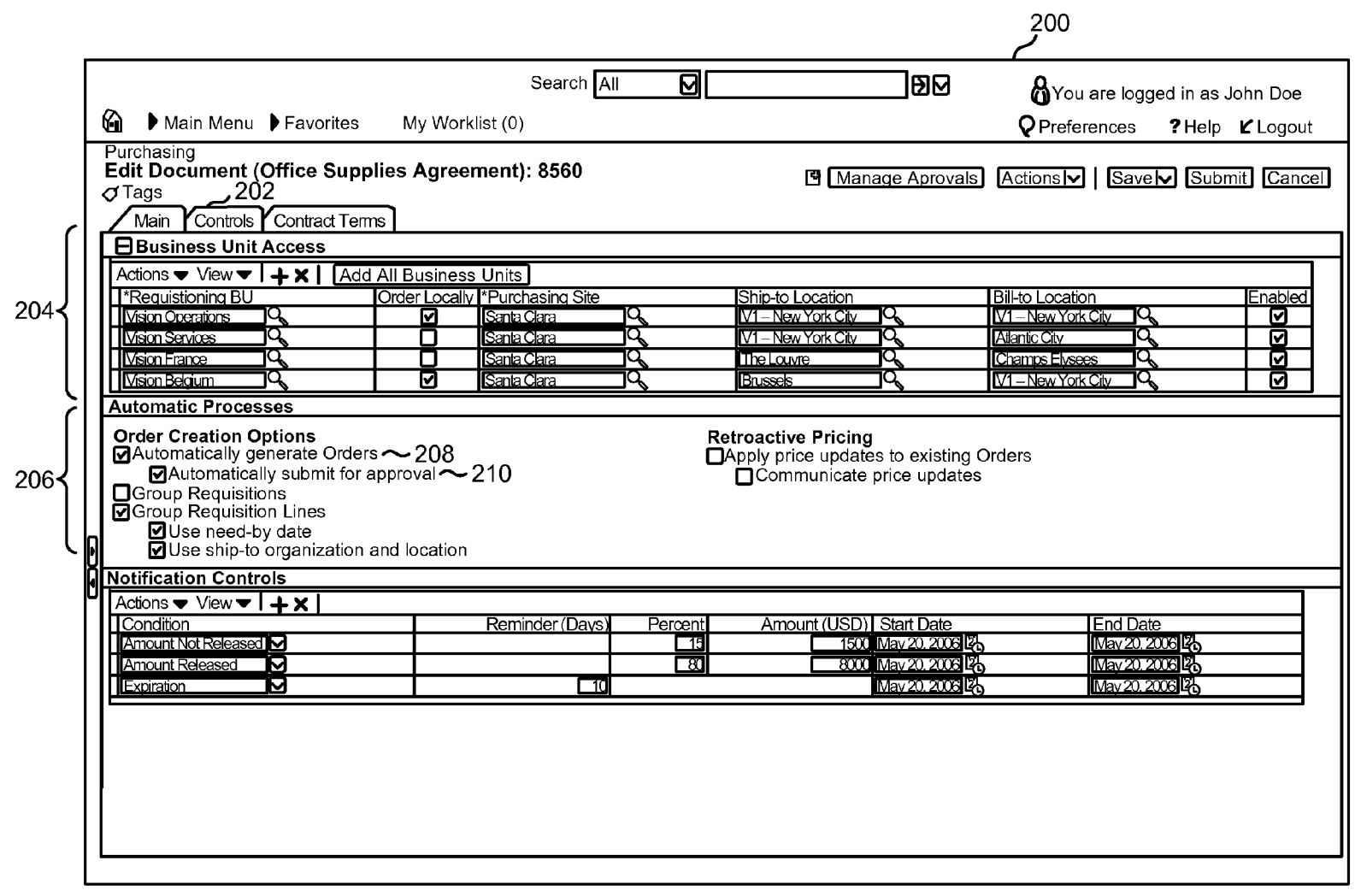

Particular embodiments provide user interfaces to configure agreements with touchless buying controls. FIG. 2 shows an example of an interface 200 that may be used to configure controls for an agreement according to one embodiment. A controls tab 202 is used to configure the controls for all items governed by the agreement. A business unit access section 204 includes controls for various business units. For example, for different business units, different purchasing sites, ship-to locations, and bill-to locations are provided. Also, the option to order items locally may be configured.

In an automatic processes section 206, the touchless buying controls are provided. For example, at 208, a control for automatically generating orders is provided. This indicates whether or not a purchase order should be automatically generated if this agreement is used. By checking a box for this control, purchase orders will be automatically generated if an item is ordered using this agreement. Also, at 210, a control for automatically submitting the order for approval may be configured. This control determines whether the auto-generated purchase order should be automatically submitted for approval and communicated to the supplier.

Figure 3:
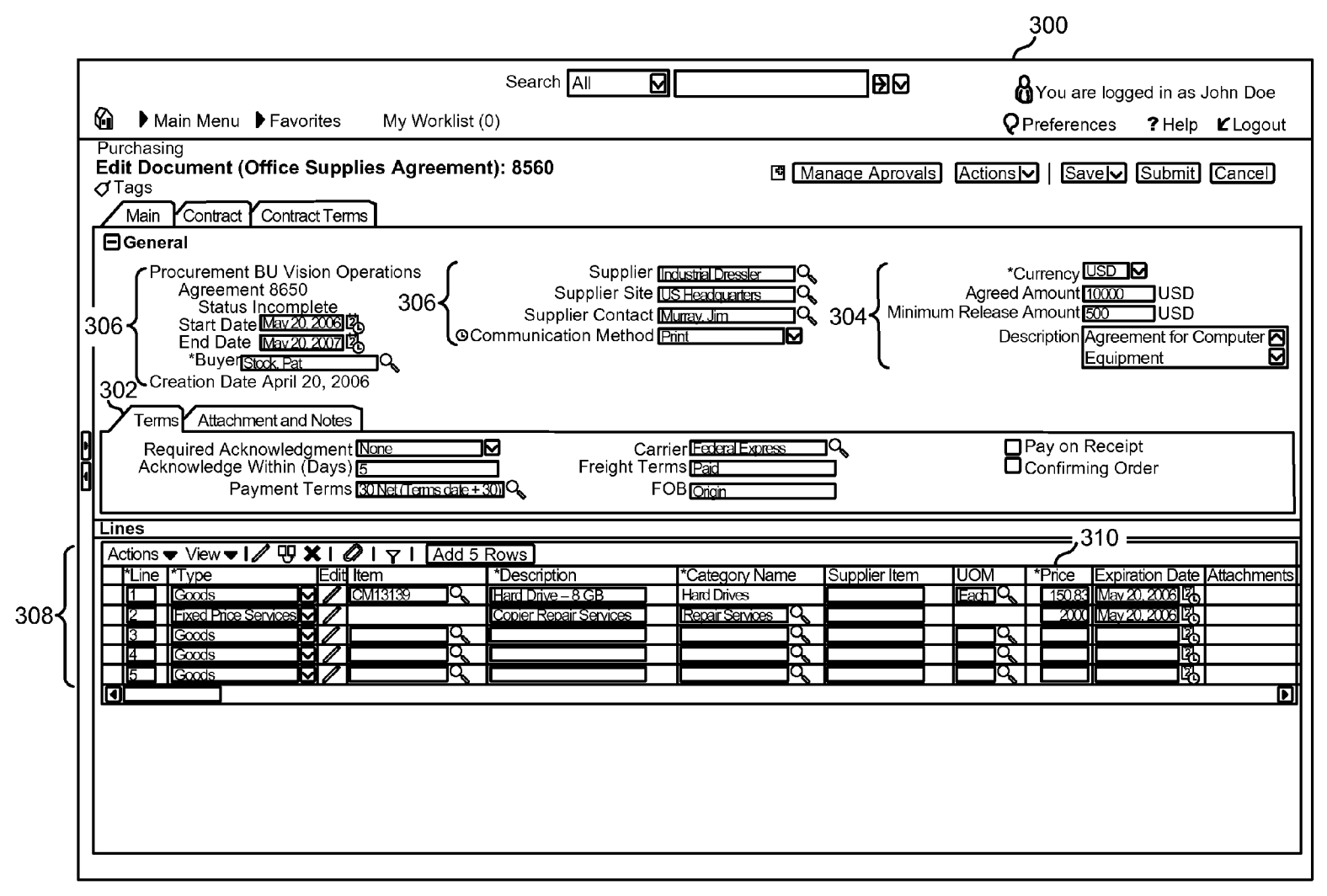

FIG. 3 depicts an example interface 300 for setting the terms for an agreement according to one embodiment. The terms section 302 provides the terms that can be applied to all items for the agreement. For example, the payment terms, shipping terms, and any other terms are shown here. Section 304 shows terms related to the agreed volume of business on this agreement with the supplier, the minimum ordered amount when an order is placed, the currency that will be used for order transactions, and a description of the agreement. Other terms may be provided at 306, such as a start and end date, supplier information and communication methods, and other terms that are not described.

The terms that are provided are for individual items shown in section 308. This section includes different items that are offered by the agreement. The terms shown in section 302, 304, and 306 above may be applied to all of the items in section 308. The items in section 308 may also include pricing information for each individual item at 310.

Figure 4:
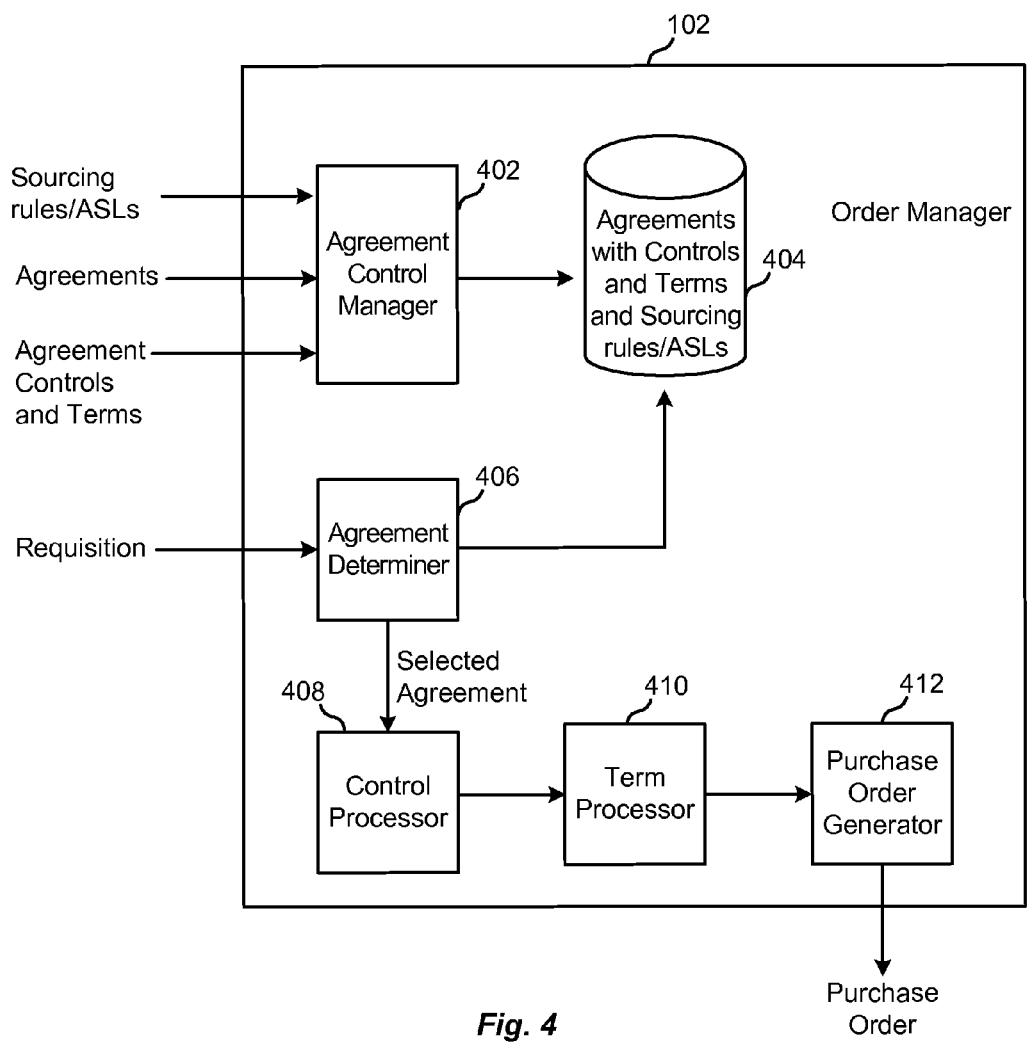
FIG. 4 depicts a more detailed example of an order manager according to one embodiment.

FIG. 4 depicts a more detailed example of order manager 106 according to one embodiment. Order manager 106 receives the agreements, agreement controls, and terms at an agreement control manager 402. For example, the agreements configured using interfaces 200 and 300 are received. The controls and terms may be received as metadata or in any other format. Sourcing rules/ASLs are also received.

Agreement control manager 402 can store the agreements with the controls, terms and sourcing rules/ASLs in storage 404. For example, storage 404 may be a database or global repository.

Once the configuration is complete, a requisition from a user may be received. The requisition includes one or more items for purchase. Agreement determiner 406 may first search for sourcing rules/ASLs for the item. If found, the ASL is used to determine an agreement from storage 404. If a sourcing rule and/or ASL are not found, a search for an agreement that includes the item is then performed. The search for the agreement may be performed using a priority system. In one embodiment, agreements that include the item may be ranked and the agreement determined to be of the highest priority is selected. In another example, the most recently active (or last used) agreement that includes the item is selected. It will be understood that other priority systems may be used.

Once the agreement is selected, a control processor 408 determines the controls associated with the agreement. As discussed above, the controls are used to determine the degree of touchlessness for the agreement. These controls apply to all items of the agreement.

Once the controls are determined, a term processor 410 determines the terms for the agreement. The terms are used to generate the purchase order for the item. As discussed above, the terms may apply to all the items of the agreement.

A purchase order generator 412 then automatically generates a purchase order if the controls are set for auto-generation of the purchase order. The purchase order may then be sent for approval or auto-approved.

Figure 5:
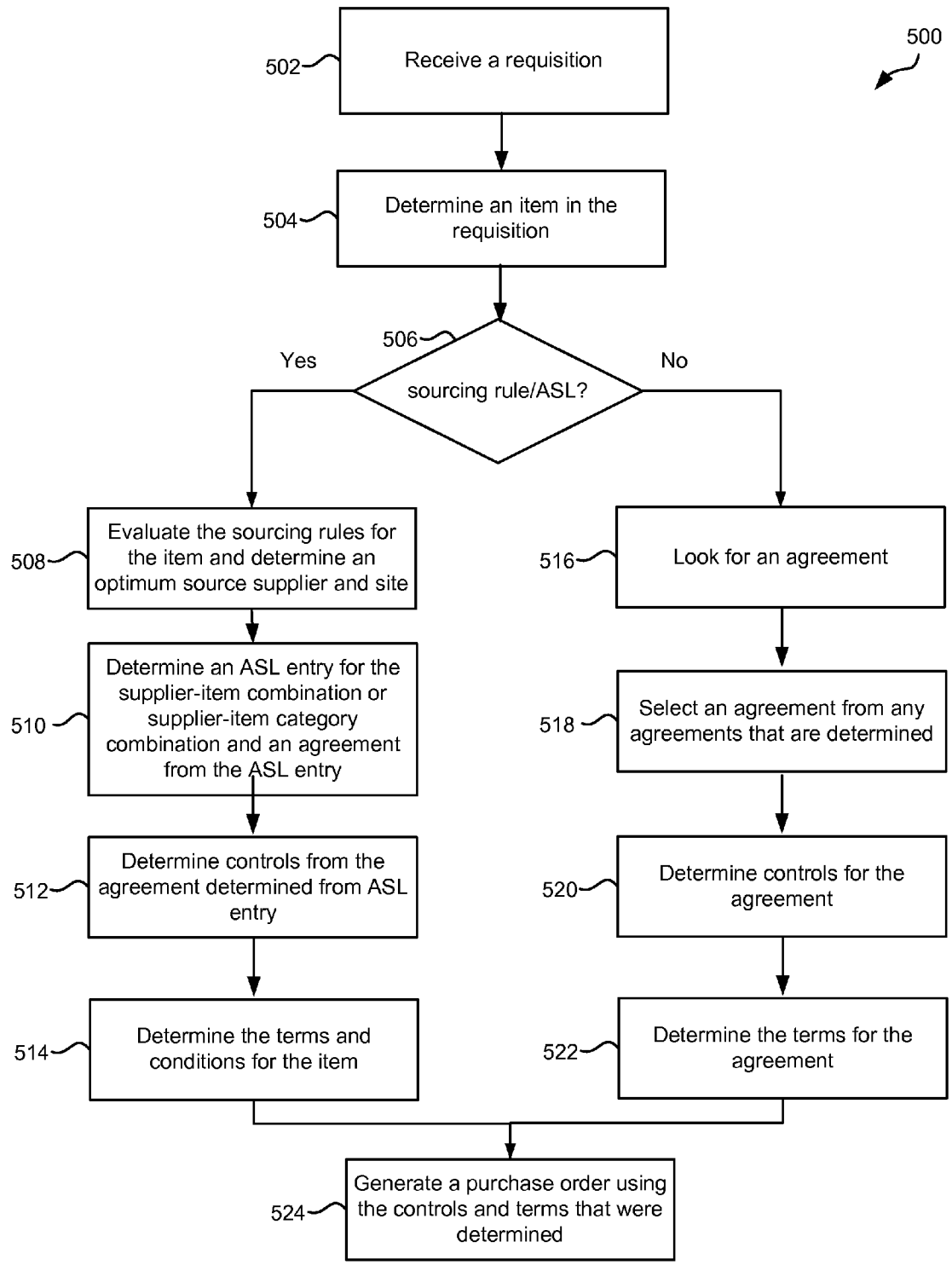
FIG. 5 depicts a simplified flowchart for determining a method to generate a purchase order according to one embodiment.

FIG. 5 depicts a simplified flowchart for determining a method to generate a purchase order according to one embodiment. Step 502 receives a requisition. Step 504 then determines an item in the requisition.

Step 506 then determines if a sourcing rule/ASL has been configured for the item. For example, sourcing rules may be searched to determine if there is a preferred source that can provide the item. If there is a sourcing rule present, step 508 evaluates the sourcing rules for the item and determines an optimum source supplier and site.

Step 510 then determines an ASL entry for the supplier-item combination or supplier-item category combination. The ASL entry may specify an agreement. Step 512 then determines touchless buying controls for the agreement. Step 514 also determines the terms and conditions for the item from the agreement. The agreement is used to determine the terms that are used to create the purchase order. For example, an agreement listed on the ASL entry for the item may be used to determine the agreement to use. The process then generates a purchase order as described in step 524.

If a sourcing rule or ASL entry is not found, step 516 looks for an agreement. The agreement includes the item that is being requested.

Step 518 then selects an agreement from any agreements that are determined. For example, certain priority rules may be used to determine the agreement. In one embodiment, the most recent active agreement that includes the item is used. The supplier for the item is the supplier associated with the agreement.

The process then goes to step 512, which determines controls for the agreement, and step 514, which determines the terms for the agreement. Step 524 then generates a purchase order using the controls and terms that were determined. Thus, a hybrid system is provided that allows the use of sourcing rules/ASLs in addition to agreement-level searches. A company can choose to use the extensive functionality provided by the sourcing rule/ASL to source requisitions if their business needs dictate a complex procurement strategy with multiple sources for each item. Alternatively for most companies with a simple procurement strategy with a single source for each item, setting up an agreement with controls is sufficient to source requisition demand.

Particular embodiments provide many advantages. This solution provides for a lower cost of ownership. The configuration of the agreements with controls and terms reduces operational costs for buyers using the procurement system. The expensive functionality offered by sourcing rules and ASLs may not be needed. If an agreement includes 1000 items, the company may need to invest hours in setting up the sourcing rules and ASL entries for each item (a total of 2000 records). Instead the company can setup the controls for all these 1000 items, just once on the agreement. Further, these sourcing rules and ASL entries need to be maintained on an ongoing basis. Just for one agreement, there is a large savings of time in configuring the items. The potential savings are even larger when there are a large number of agreements.

Particular embodiments also offer more flexibility. For example, buyers can determine how much functionality they actually want. If sourcing rules and ASL entries are required for an item, they may be configured. However, the controls do not need to be configured for each ASL. Also, setting up agreement-level controls is sufficient to automatically generate and send purchase orders to a supplier. The agreement level configuration can be used because typically items for a single supplier are usually governed by the same controls and terms. Thus, configuration of per-item sourcing rules and ASLs may not be necessary in most cases. The hybrid system also allows use of sourcing rules and ASLs that may be applied on a per-item basis but are not required for all items that are being offered by an organization.

Accordingly, the configuration of the touchless buying system has been simplified by allowing users to configure controls on the agreement level and not the per-item level. Further, the auto-generation of purchase orders is simplified because sourcing rules and ASL entries for each item do not need to be setup in order to generate a purchase order. Rather, agreements are searched for a requested item and the controls and terms for that agreement are used to generate the purchase order.

Although the description has been described with respect to particular embodiments thereof, these particular embodiments are merely illustrative, and not restrictive.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be executable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method comprising:
receiving one or more controls for a plurality of agreements, each agreement including a plurality of items for purchase;
receiving a requisition from a requestor for a target item;
ascertaining with a computing device, whether a sourcing rule is applicable to the target item;
determining, in response to ascertaining that the sourcing rule is not applicable to the target item, an agreement from the plurality of agreements that includes the target item from the requisition within a plurality of items included in the agreement;
determining, by the computing device, one or more controls for the agreement, the controls being set for the agreement, with the controls applying to all of the plurality of items included in the agreement;
determining if the one or more controls indicate the requisition should be automatically converted to a purchase order;
automatically generating, by the computing device, the purchase order for the target item if the one or more controls for the agreement indicate the requisition should be automatically converted to the purchase order; and
outputting the purchase order, the purchase order generated without manual intervention by a buyer.

2. The method of claim 1, wherein the agreement comprises terms needed to generate the purchase order, wherein the terms are set for the agreement.

3. The method of claim 2, wherein the terms include terms and conditions and pricing information.

4. The method of claim 1, wherein the plurality of items of the agreement are not associated with individual controls that only apply to a single item.

5. The method of claim 1, wherein a first control in the one or more controls comprises a first option to set the agreement to auto-generation of the purchase order once the requisition is received.

6. The method of claim 5, wherein a second control in the one or more controls comprises a second option to set the agreement to auto-approve the generated purchase order without manual intervention by the buyer, wherein the generated purchase order is auto-approved.

7. The method of claim 1, further comprising:
using the sourcing rule to determine a supplier for the target item in response to ascertaining that the sourcing rule is applicable to the target item.

8. The method of claim 7, further comprising:
determining if an approved supplier list (ASL) applies to the target item and the determined supplier;
determining an agreement from the ASL; and
using the one or more controls from the agreement to generate the purchase order.

9. The method of claim 1, wherein determining the agreement comprises using an agreement level priority to select the agreement from one or more agreements that include the item.

10. The method of claim 1, further comprising configuring the plurality of agreements with the one or more controls, wherein ASL entries are not configured with controls for each item.

11. The method of claim 1, wherein the buyer is a user that converts a requisition to a purchase order.

12. A non-transitory computer-readable storage medium comprising encoded logic for execution by one or more computer processors, logic when executed being executable to:
receive one or more controls for a plurality of agreements, each agreement including a plurality of items for purchase;
receive a requisition from a requestor for a target item;
ascertain, by the one or more computer processors, whether a source rule is applicable to the target item;

determine, in response to a source rule not being applicable to the target item, an agreement from the plurality of agreements that includes the target item from the requisition within a plurality of items included in the agreement, with the controls providing the following functions;

determine, by the one or more computer processors, one or more controls for the agreement, the controls being set for the agreement, with the controls applying to all of the plurality of items included in the agreement;

determine if the one or more controls indicate the requisition should be automatically converted to a purchase order;

automatically generate, by the one or more computer processors, the purchase order for the target item if the one or more controls for the agreement indicate the requisition should be automatically converted to the purchase order; and output the purchase order, the purchase order generated without manual intervention by a buyer.

13. The computer-readable storage medium of claim 12, wherein the agreement comprises terms needed to generate the purchase order, wherein the terms are set for the agreement.

14. The computer-readable storage medium of claim 12, wherein the plurality of items of the agreement are not associated with individual controls that only apply to a single item.

15. The computer-readable storage medium of claim 12, wherein a first control in the one or more controls comprises a first option to set the agreement to auto-generation of the purchase order once the requisition is received.

16. The computer-readable storage medium of claim 15, wherein a second control in the one or more controls comprises a second option to set the agreement to auto-approve the generated purchase order without manual intervention by the buyer, wherein the generated purchase order is auto-approved.

17. The computer-readable storage medium of claim 12, wherein the logic when executed is further executable to:
use the source rule to determine a supplier to order the target item in response to the source rule being applicable to the target item.

18. The computer-readable storage medium of claim 17, wherein the logic when executed is further executable to:
determine if an approved supplier list (ASL) applies to the target item and the determined supplier;
determine an agreement from the ASL; and
use the one or more controls from agreement to generate the purchase order.

19. The computer-readable storage medium of claim 12, wherein logic executable to determine the agreement comprises logic executable to use an agreement level priority to select the agreement from one or more agreements that include the item.

20. An apparatus comprising:
one or more computer processors; and
logic encoded in one or more computer-readable storage media for execution by the one or more computer processors and when executed executable to:
receive one or more controls for a plurality of agreements, each agreement including a plurality of items for purchase;
receive a requisition from a requestor for a target item;
ascertain whether a source rule is applicable to the target item;
determine, in response to the source rule not being applicable to the target item, an agreement from the plurality of agreements that includes the target item from the requisition within a plurality of items included in the agreement;
determine, by the one or more computer processors, one or more controls for the agreement, the controls being set for the agreement, with the controls applying to all of the plurality of items included in the agreement;
determine if the one or more controls indicate the requisition should be automatically converted to a purchase order;
automatically generate, by the one or more computer processors, the purchase order for the target item if the one or more controls for the agreement indicate the requisition should be automatically converted to the purchase order; and
output the purchase order, the purchase order generated without manual intervention by a buyer.

* * * * *

UNITED STATES PATENT AND TRADEMARK OFFICE
CERTIFICATE OF CORRECTION

| | | |
|---|---|---|
| PATENT NO. | : 8,799,110 B2 | Page 1 of 1 |
| APPLICATION NO. | : 12/558481 | |
| DATED | : August 5, 2014 | |
| INVENTOR(S) | : Lobo et al. | |

It is certified that error appears in the above-identified patent and that said Letters Patent is hereby corrected as shown below:

In the Claims

In column 10, line 1, in Claim 1, delete "ascertaining" and insert -- ascertaining, --, therefor.

Signed and Sealed this
Third Day of March, 2015

Michelle K. Lee
*Deputy Director of the United States Patent and Trademark Office*